Patented Mar. 24, 1953

2,632,717

UNITED STATES PATENT OFFICE 2,632,717

PROCESS FOR IMPROVING THE RESISTANCE OF WOOL TO FELTING AND SHRINKING

Albert Landolt, Riehen, Switzerland, assignor to Ciba Limited, a Swiss firm

No Drawing. Application February 4, 1948, Serial No. 6,335. In Switzerland February 7, 1947

2 Claims. (Cl. 117—141)

It is known that resins are obtained by the condensation of aldehydes with aminotriazines, especially of formaldehyde with melamine, if desired, with the aid of known catalysts of an alkaline or an acid character. Depending on the degree of condensation these resins may have hydrophilic properties, that is to say they may be soluble in water in all proportions, or hydrophobic properties. The hydrophobic resins are those of which concentrated solutions cannot be diluted with water to an unlimited extent without precipitation taking place. It is also known that such hydrophobic resins, provided that they are not too highly condensed, are unrestrictedly soluble in an acid medium to give a clear solution. This property of solubility is to a great extent reversible in that when the pH value of a solution of a hydrophobic resin in an acid medium is raised (for example, by the addition of an alkali) a precipitate is formed which redissolves upon the addition of an acid. It is clear that, depending on the degree of condensation, on the molecular ratio of the aldehyde to the aminotriazine and on the concentration of the solution and the general character of the resin in question, there must be a pH value at which precipitation of the resin is just prevented.

It is also known that a very wide variety of fibres, especially those of vegetable character, can be improved with the aid of hydrophobic condensation products of aldehydes with aminotriazines. It has indeed already been proposed to produce certain effects on wool by means of such condensation products. However, the present invention is concerned with imparting to wool a very good resistance to felting and shrinking by observing special conditions of treatment.

According to this invention an especially good resistance to felting and shrinking is imparted to wool by treating it with an acid solution of a hydrophobic resin from an aminotriazine and an aldehyde at a pH value which is in the vicinity of that at which precipitation of the resin is just prevented.

The wool may be treated in accordance with the invention at any desired stage in its manufacture, but advantageously after it has been spun, that is to say especially in the form of yarn or a woven or knitted fabric. In other respects the wool may be pretreated in known manner, for example, it may be bleached or dyed, provided only that it possesses an adequate capacity for being wetted. If desired, the wetting capacity of the wool may be improved by the addition of a wetting agent which is active in an acid medium.

As hydrophobic resins from aldehydes and aminotriazines there are advantageously used in the process of the invention resins from formaldehyde and melamine. The hydrophobic properties of the resin are advantageously so chosen that the point at which precipitation is just avoided in dilute solutions, for example, solutions of 1 to 15 per cent. strength, lies at a pH value of about 2.5 to 4, and advantageously in the region of 3. In carrying out the process there are advantageously used baths which contain in 1000 parts of water 20–200, and advantageously 50–100, parts of the hydrophobic resin.

The adjustment of the pH value in the vicinity of the point at which precipitation of the resin is just avoided may be brought about, for example, by dissolving the hydrophobic resin in an excess of the acid, especially formic acid or hydrochloric acid, and subsequently increasing the pH value by the addition of an alkali. In many cases it is of advantage to predetermine by experiment the quantity of the acid in question which is required to give the desired pH value. It is permissible to add buffer substances to the baths, but in most cases this is not necessary as the hydrophobic resin itself exerts an adequate buffer action.

In some cases it is also possible to make up the bath so that it has a pH value which would be below the desired working value, and then to allow the bath to stand, if desired, at a raised temperature, until the condensation of the hydrophobic resin has advanced to such a degree that the original pH value corresponds to the desired working value.

Depending on the effect desired, it may be of advantage to work at a pH value which is somewhat lower or somewhat higher than is just necessary to yield a clear solution of the resin, a somewhat higher pH value being such that precipitation of hydrophobic resin occurs in the treatment bath and a somewhat lower pH value being such that precipitation is avoided throughout the whole period of treatment. In this connection it is necessary to take into account the fact that the pH value of the bath always increases somewhat during the treatment owing to the acid-binding properties of the wool. If desired, the increase in pH value caused by the wool may be prevented by the addition of corresponding quantities of acid.

If it is absolutely necessary to avoid a dusting of the finished goods it is preferable to use baths which remain free from turbidity throughout the whole period of treatment. In some cases, however, treated wool having a somewhat better resistance to shrinking or felting is obtained with baths which exhibit precipitation.

For the treatment of wool with the baths described above apparatus which is generally known and customary in the dyeing industry may be used, for example, vats, reels, jiggers, foulards or padding machines, dye circulating appliances and the like. In most cases a period of treatment of about 15 minutes will suffice. In some cases the period may be shortened to 10 or 5 minutes, or, when necessary, prolonged. The temperature of treatment may range from room temperature (about 20° C.) to 60–70° C., the acceleration of the further condensation of the resin at raised temperatures being obviously taken into account. In many cases a medium temperature of about 25–40° C. is of advantage.

After the treatment the goods may be freed from surplus liquor in the usual manner, for example, by squeezing or centrifuging, and then dried. The fact that a hardening treatment at a raised temperature, such as is necessary in many other improving processes, is not an absolute necessity is an important advantage of the present process. In certain instances, a special hardening treatment at an elevated temperature, for instance above 100° C., may yet be appropriate.

Depending upon the use for which the wool is destined, it may be subjected, after drying, to another treatment in a bath consisting of water alone or of water containing neutralizing, washing, wetting, or softening agents or several such agents in combination. By a treatment for 10 minutes at about 40° C., if desired, with simultaneous mechanical treatment, an improved feel may in some cases be achieved.

The wool which has been improved by the present process has a pleasant feel and a considerably enhanced resistance to felting and shrinking without having the known disadvantages of chlorinated wool. An estimation of the swelling in caustic soda of the wool thus treated shows that the wool has acquired a considerable resistance to swelling.

The following examples illustrate the invention, the parts being by weight unless otherwise stated, and the relationship of parts by weight to parts by volume being the same as that of the kilogram to the litre:

Example 1

80 parts of a hydrophobic melamine-formaldehyde resin, of which a hydrochloric acid solution containing 10 per cent. of the resin just fails to yield a precipitate in the vicinity of a pH value of 3, are dissolved in 240 parts of boiling water, and the solution is poured into a mixture of 648 parts of cold water with 32 parts by volume of formic acid of 85 per cent. strength. 100 parts of wool yarn are worked for 15 minutes at 20° C. in the resulting bath, and then centrifuged and dried. In order to improve the feel of the wool it may, if desired, be treated for 10 minutes at 40° C. with a solution of 1 part of sodium N-benzyl-$\mu$-heptadecyl-benzimidazole disulphonate and 1 part of concentrated ammonia solution in 3000 parts of water. The resulting wool yarn, when washed in soap baths with a simultaneous rubbing and pressure treatment shrinks less than the untreated wool.

Example 2

115 parts of the hydrophobic melamine-formaldehyde resin used in Example 1 are dissolved in 345 parts of boiling water. The solution is cooled, and 506 parts of water, which contains 34 parts by volume of hydrochloric acid of 33.5 per cent. strength, are poured into it. The bath so prepared is brought to a temperature of 35° C. and maintained at that temperature for 3 hours. 100 parts of wool are then treated in the liquor for 10 minutes, centrifuged, and dried.

Example 3

100 parts of a hydrophobic melamine-formaldehyde resin, of which a hydrochloric acid solution containing 10 per cent. of the resin just shows a slight turbidity at a pH value of about 3.1, are dissolved in a small quantity of boiling water, and added to a bath containing 32 parts by volume of hydrochloric acid of 35 per cent. strength. In this manner a pH value of about 3.2 is attained. The bath is brought to a temperature of 32° C., allowed to stand for 15 minutes, and 100 parts of wool are treated therein. The bath is then somewhat turbid. The wool is then squeezed or preferably centrifuged, and dried. If desired, it may be subjected to a softening treatment analogous to that described in Example 1. As compared with the starting material the wool so treated exhibits a considerably improved resistance to felting and shrinking.

By using 36 parts by volume of hydrochloric acid, instead of 32 parts by volume, a pH value of about 2.9 is attained, and the bath shows no, or at most an unimportant amount of, turbidity. A wool having similar properties is obtained.

On the other hand, by using 40 parts by volume of hydrochloric acid a pH value of about 2.6 is attained, and wool treated in that bath exhibits a considerably poorer resistance to felting and shrinking than the wool treated in accordance with the first or second paragraph of this example and, as compared with the untreated wool, is not substantially improved.

Example 4

100 parts of the hydrophobic melamine-formaldehyde resin mentioned in Example 1 are dissolved in 300 parts of boiling water. The solution is cooled to 40° C. and poured into a mixture of 600 parts of water and 40 parts of hydrochloric acid of 30% strength at 40° C.

The bath is left standing for ¼ hour at 40° C. in order to promote condensation. Wool flannel is then impregnated in this bath on a foulard, squeezed to acquire an increase in weight amounting to 70%, and dried for 2 hours at 70° C.

Finally, the fabric is washed with water at 40° C. for 10 minutes in order to remove the excess of acid and the superficially adhering resin, well rinsed, then hydroextracted, and dried. The washing bath may contain neutralizing, washing, wetting and softening agents. During the washing treatment the fabric may be subjected to an additional mechanical treatment, whereby a further improvement of the feel is obtained. The treated fabric shows an essentially improved resistance to felting and shrinking and possesses a full and soft feel.

Wool yarn may be treated in a similar manner, but after impregnation with the said melamine-formaldehyde resin solution the yarn is preferably hydroextracted.

Having thus described the invention, what is claimed is:

1. A process for improving the resistance of wool to felting and shrinking, which comprises immersing the wool for a period of at least 5 minutes in an acid bath maintained at a pH of about 2.5 to 4 and at a temperature of about 20° C. to about 70° C., said bath containing 20 to 200 parts of a condensation product of melamine and formaldehyde per 1000 parts of water, a hydrochloric acid solution containing 1 to 15% of the said condensation product just failing to give a precipitate at a pH of about 2.5 to 4, and thereafter removing the treated wool from the acid bath and drying the wool at said temperature.

2. A process for improving the resistance of wool to felting and shrinking, which comprises immersing the wool for a period of from about 5 to 15 minutes in a hydrochloric acid bath maintained at a pH of about 2.5 to 4 and at a temperature of about 20° C. to about 70° C., said bath containing 20 to 200 parts of a hydrophobic condensation product of melamine and formaldehyde per 1000 parts of water, a hydrochloric acid solution containing 1 to 15% of the said condensation product just failing to give a precipitate at a pH of about 2.5 to 4, and thereafter removing the treated wool from the acid bath and drying the wool at said temperature.

ALBERT LANDOLT.

REFERENCES CITED

The following references are of record in the file of this patent:

UNITED STATES PATENTS

| Number | Name | Date |
|---|---|---|
| 2,329,622 | Johnstone et al. | Sept. 14, 1943 |
| 2,394,009 | Pollard | Feb. 5, 1946 |
| 2,429,073 | Rickus et al. | Oct. 14, 1947 |